(12) United States Patent  
Maloney et al.

(10) Patent No.: US 8,339,756 B2
(45) Date of Patent: Dec. 25, 2012

(54) CONTROL CIRCUIT HAVING A DELAY-REDUCED INVERTER

(75) Inventors: Timothy J. Maloney, Palo Alto, CA (US); Bruce Chou, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 12/641,274

(22) Filed: Dec. 17, 2009

(65) Prior Publication Data

US 2011/0149450 A1 Jun. 23, 2011

(51) Int. Cl.
*H02H 3/22* (2006.01)
(52) U.S. Cl. .......................... 361/56; 361/111
(58) Field of Classification Search ................ 361/56, 361/91, 111
See application file for complete search history.

(56) References Cited

U.S. PATENT DOCUMENTS

| | | | |
|---|---|---|---|
| 7,085,113 B2 * | 8/2006 | Gauthier et al. | 361/56 |
| 7,102,862 B1 * | 9/2006 | Lien et al. | 361/56 |
| 7,288,947 B2 * | 10/2007 | Park et al. | 324/713 |
| 7,397,641 B2 * | 7/2008 | Chu et al. | 361/56 |
| 7,423,855 B2 * | 9/2008 | Fankhauser et al. | 361/56 |
| 8,068,319 B1 * | 11/2011 | Chan | 361/56 |
| 2010/0033884 A1 * | 2/2010 | Fan et al. | 361/56 |

* cited by examiner

*Primary Examiner* — Danny Nguyen
(74) *Attorney, Agent, or Firm* — Schwabe, Williamson & Wyatt, P.C.

(57) ABSTRACT

In some embodiments, a power supply clamp may include a switchable discharge device configured to discharge an electrostatic discharge; and a control circuit configured to generate a control voltage to turn off the discharge device at a shutoff time, with the shutoff time being long enough to allow the electrostatic discharge though the discharge device but short enough to reduce a duration of a power-up current transient through the discharge device. Other embodiments may be described and claimed.

27 Claims, 4 Drawing Sheets

CONTROL CIRCUIT HAVING A DELAY-REDUCED INVERTER

BACKGROUND

1. Technical Field

Embodiments of the present disclosure are related to the field of integrated circuit, and in particular, to power supply clamp circuits for protection against electrostatic discharge events.

2. Description of Related Art

Electrostatic discharge (ESD) refers to the phenomenon of electrical discharge of high current for a short time duration resulting from a buildup of static charge on a particular integrated circuit (IC) package, or on a nearby human handling of that particular IC package. ESD events can have serious detrimental effects on manufacture and performance of ICs and other microelectronic devices, systems that contain such devices, and manufacturing facilities that produce them.

Power supply clamps for electrostatic discharge (ESD) protection have been used for some time. Generally, such ESD supply clamps protect an IC against static discharge by non-destructively passing large currents through a low impedance path of a discharge transistor for a relatively short, controlled time.

On recent low-power or battery-powered products, power supplies for internal ICs are ramped up often and quickly, with ramp times now in the 10 s of microseconds, and heading lower. ESD supply clamps have a power-up current transient that was easy to mitigate when the ramp times were at the millisecond level, as in earlier designs. For example, in the past, a pull-up resistor of a few hundred ohms has been connected to the gate of the discharge transistor for overshoot reduction of the power-up current transient and for power savings. But now the performance expectation of low power draws through the newly speeded-up power ramps creates a need for new ESD supply clamp design involving more aggressive power management.

DETAILED DESCRIPTION OF ILLUSTRATIVE EMBODIMENTS

In the following description, for purposes of explanation, numerous details are set forth in order to provide a thorough understanding of the disclosed embodiments. However, it will be apparent to one skilled in the art that these specific details are not required in order to practice the disclosed embodiments. In other instances, well-known electrical structures and circuits are shown in block diagram form in order not to obscure the disclosed embodiments. The term "coupled" shall encompass a direct connection, an indirect connection or an indirect communication.

Figure 1:
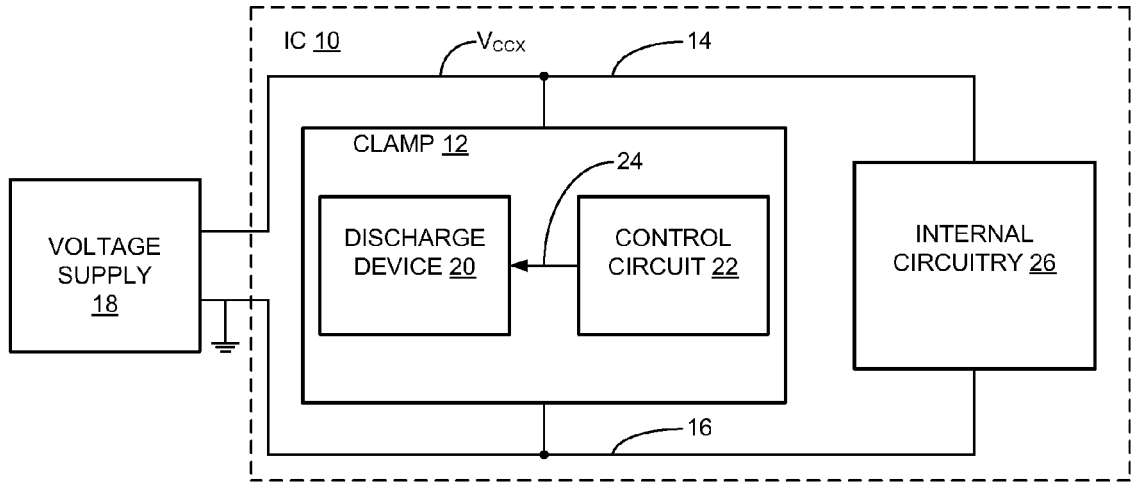
FIG. 1 illustrates a block diagram of an integrated circuit having a power supply clamp, according to various embodiments of the present disclosure.

FIG. 1 illustrates a block diagram of an exemplary integrated circuit (IC) 10, which includes an electrostatic discharge (ESD) protection circuit in the form of a power supply clamp 12, according to various embodiments of the present disclosure. The IC 10 may have a power supply rail 14 and a ground rail 16 for receiving an externally-provided supply voltage $V_{CCX}$ from a voltage supply circuit 18. The clamp 12 may include a current sinking circuit in the form of a switchable discharge device 20 coupled between the supply and ground rails 14 and 16. The discharge device 20 may have a control gate terminal and may shunt current from the supply rail 14 to the ground rail 16 when "on" or in its conductive state. The clamp 12 may further include a control circuit 22 coupled between the supply and ground rails 14 and 16. The control circuit 22 may include gate-driving circuitry including an inverter chain and may provide a control voltage to the control gate terminal of the discharge device 20 to turn the discharge device 20 "off" so as to be in a non-conductive state.

The IC 10 may further include an internal circuitry 26 coupled between the supply and ground rails 14 and 16 and designed to perform a predetermined function. The clamp 12 may protect internal circuitry 26 from an electrostatic discharge. More specifically, the supply voltage rail 14 may be subjected to an electrostatic discharge event. The clamp 12 may protect the IC 10 against electrostatic discharge by non-destructively passing for a short time period large currents through a low impedance path of the discharge device 20 when it is "on" or in its conductive state. The IC 10 may be any type of integrated circuit which receives a supply voltage, including, but not limited to, processors, controllers, memory devices, application specific integrated circuits (ASIC), etc. In some embodiments, the voltage supply circuit 18 may be a low power supply that provides on the supply rail 14 with a fast power ramp in the 10 s of microseconds or less to achieve the supply voltage $V_{CCX}$. As a consequence of providing protection from an electrostatic discharge during component handling, the ordinary power-up of the IC 10 may be affected. The clamp 12, in its conductive state, may produce a power-up current transient in the form of a surge current between the supply rail 14 and ground rail 16 in response to the power ramp on the supply rail 14. This power-up current transient in turn may cause additional power consumption by the IC 10, i.e., more total charge for power-up to the supply voltage $V_{CCX}$. With respect to the appended claims, it should be noted that during a power ramp when the power-up current transient passes through the discharge device 20, there may or may not be an electrostatic discharge passing through the discharge device 20 depending upon whether or not there has been an electrostatic discharge event.

In accordance with the various embodiments of the present disclosure, the control circuit 22 may be configured to generate the control voltage to turn off the discharge device 20 at a shutoff time, with the shutoff time being long enough for shunting the electrostatic discharge, if any, though the discharge device 20, but short enough to substantially reduce the above-described power-up current transient, and thereby reduce power consumption. In other words, the shunting/conducting duration of the discharge device 20, when it is in its conductive state, may be controlled by the control circuit 22 to be substantially shorter in duration than the power ramp of the IC 10.

In some embodiments, the inverter chain of the control circuit 22 may include a delay-reduced or speeded-up inverter (hereinafter, referred to as a "delay-reduced inverter" or "speeded-up inverter") having a threshold-free device in the form of an inverter-input, pull-up or pull-down resistor (hereafter generically referred to as an "inverter-input resistor" or a "pull resistor") coupled between at least one input of the delay-reduced inverter and a selected one of the supply rail 14 or ground rail 16. When coupled to the supply rail 14, the inverter-input resistor may be referred to as a "pull-up resistor" and when coupled to the ground rail 16, this inverter-input resistor may be referred to as a "pull-down resistor". The inverter-input resistor may reduce the delay of the delay-reduced inverter in changing the polarity (output state) of its output.

The time it takes for the delay-reduced inverter to change or switch its output state in response to a gate voltage at its input gates may be referred to as an "output changing time" of the delay-reduced inverter and is included in the above-mentioned shutoff time for the discharge device 20. In general, the gate voltage may increase until it reaches a tripping threshold that triggers a change of logic state at the output of the delay-reduced inverter. The inverter-input resistor may allow the input gates of the delay-reduced inverter to reach power or ground, as the case may be, more quickly during the power ramp of the IC 10. Hence, the delay-reduced inverter may change its output state more quickly (trip more quickly) and subsequently allow the discharge device 20 to turn "off" sooner. In other words, a delay-reduced inverter is one where an inverter-input resistor biases the gate voltages of the delay-reduced inverter so that the delay-reduced inverter may be tripped sooner than it would otherwise without the inverter-input resistor. Hence, the inverter-input resistor may reduce the output changing time of the delay-reduced inverter (hereafter, referred to as a "reduced output changing time") and therefore reduce the shutoff time for the discharge device 20.

In some embodiments, a final-stage inverter of the inverter chain may be a sole delay-reduced inverter. In other embodiments, a three-stage inverter chain may include more than one delay-reduced inverter, e.g., both the final stage inverter and an intermediate earlier-stage inverter may be delay-reduced inverters. In yet other embodiments, an inverter other than the final-stage inverter may be the sole delay-reduced inverter. For example, in a three stage inverter chain, an intermediate, earlier-stage inverter sandwiched between a final-stage inverter and a first stage inverter (i.e., additional inverter) may be the a sole delay-reduced inverter.

In operation, the above-described power ramp may still be considerably slower than an ESD pulse ramp caused by an ESD event, with the control circuit 22 generally turning off the discharge device 20 as soon as possible after the ESD pulse ramp so as to assist in reducing the total charge for power-up. This may mean establishing the "off" voltage on the input gates of the delay-reduced inverter at a low total voltage, before the threshold voltage of the delay-reduced inverter is fully established from source to drain. The inclusion of the inverter-input resistor, with linear I-V curve (, i.e., linear current-voltage curve) that goes through zero of a chart of current versus voltage for resistors, may achieve this. Also, the inverter-input resistor may be in the range of about 1 kilohm (1000 ohms), so that it can be overdriven during the ESD pulse by an earlier inverter stage of the gate-driving circuitry of the control circuit 22, and turn "on" the power supply clamp 12 as desired. The effect is to even further drastically reduce the amount of charge to power-up of the power supply with fast power ramps in the order of 10 s microseconds or less.

In summary, various embodiments according to the present disclosure address at least one inverter stage in the inverter chain leading to the discharge device 20 by applying the inverter-input resistor there. With the above-described placement, the inverter-input resistor provides unexpected improvements to the power-up current transient issue, while not compromising ESD protection. Hence, the use of the inverter-input resistor may have a substantial impact on power-saving, which is of growing importance in integrated circuit design, particularly for microprocessors and chipsets.

As will be illustrated in the various embodiments described hereinafter, the discharge device 20 may comprise a field effect transistor (FET), such as a p-channel metal oxide semiconductor (PMOS) FET or an n-channel metal oxide semiconductor (NMOS) FET. In the case of the discharge device 20 being a PMOS FET, when the control voltage at its input gate becomes a sufficiently positive voltage (i.e., logical 1), the discharge device 20 may turn off and thereby terminate the shunting of current from the supply rail 14 to the ground rail 16. Thus, the discharge device 20 is in a "non-conductive state" when it is "off" and is in a "conductive state" when it is "on". In the case of the discharge device 20 being an NMOS FET, when the control voltage at its input gate becomes a sufficiently negative voltage (i.e., logical 0), the discharge device 20 may turn off and therefore terminate the shunting of current from the supply rail 14 to the ground rail 16. The "ground rail" 16 may be defined as a potential which is lower than the supply voltage $V_{CCX}$ on the supply rail 14. With the inverter-input resistor having a resistance value of 1 kilohm or more, it may still be overdriven by the weaker inverter and yet still may overcome the undesired threshold voltage effects on FET bias, by virtue of being a linear component, as described above. Threshold voltage effects are inherent semiconductor effects that may give rise to loss of logic levels.

Figure 2:
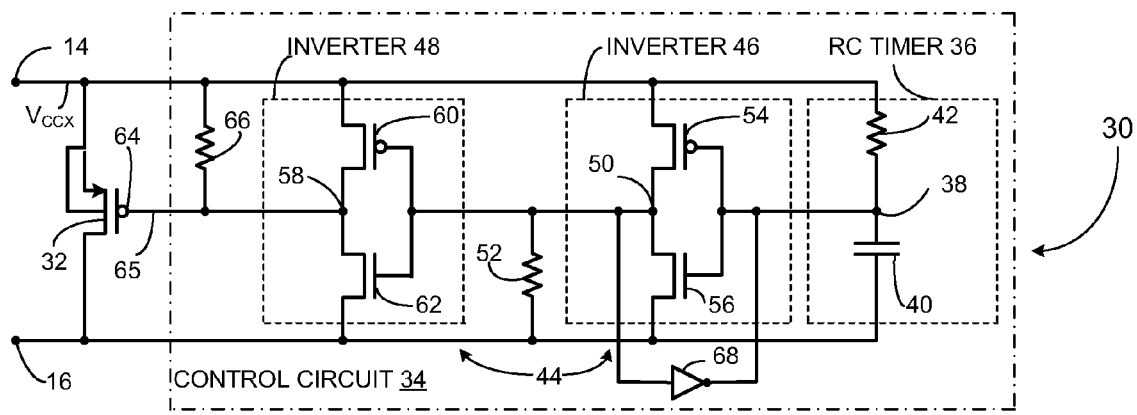
FIG. 2 illustrates a schematic diagram of a power supply clamp with a p-channel discharge transistor, according to some embodiments of the present disclosure.

With reference to FIG. 2, the clamp 12 of FIG. 1 may take the form of a power supply clamp 30, according to some embodiments of the present disclosure. The discharge device 20 of FIG. 1 may take the form of a PMOS FET 32 (hereafter, "discharge transistor") in FIG. 2, with its source coupled to the supply rail 14 and its drain coupled to the ground rail 16. The control circuit 22 of FIG. 1 may take the form of a control circuit 34 in FIG. 2. The control circuit 34 may include a resistance-capacitance (RC) timer 36 having an output node 38, a capacitor 40 coupled between the ground rail 16 and the output node 38, and a resistance 42 coupled between the supply rail 14 and the output node 38. In some embodiments, the resistance 42 of the RC timer 36 may take the form of a discrete resistor, as shown in FIG. 2. In other embodiments, the resistance 42 for the RC timer 36 may be provided by the resistance of a PMOS transistor with its source coupled to the supply rail 14, its drain coupled to the output node 38, and its gate coupled to ground rail 16 through a resistor.

The control circuit 34 may include an inverter chain 44 with an earlier-stage inverter 46 and a final-stage inverter 48. In this embodiment, the final-stage inverter 48 may also be referred to as the "delay-reduced inverter 48", as will be described hereinafter. The final-stage inverter 48 is the final inverter in the inverter chain 44 before discharge device 20 and therefore is the inverter which provides the output signal of the inverter chain 44. The earlier-stage inverter 46 is earlier in the inverter chain 44 with respect to signal propagation through the inverter chain 44. An output node 50 of the earlier-stage inverter 46 may be coupled to an input of the delay-reduced inverter 48. Coupled between the output node 50 of the earlier-stage inverter 46 and input of the delay-reduced inverter 48 and the ground rail 16 may be the inverter-input resistor 52, as described above, which may be a pull-down resistor in this embodiment.

In some embodiments, the earlier-stage inverter 46 may include the output node 50, a PMOS transistor 54 with its source coupled to the power supply rail 14 and its drain coupled to the output node 50, and an NMOS transistor 56 with its drain coupled to the output node 50 and its source coupled to the ground rail 16. Likewise, the delay-reduced inverter 48 may include an output node 58, a PMOS transistor 60 with its source coupled to the power supply rail 14 and its drain coupled to the output node 58, and an NMOS transistor 62 with its drain coupled to the output node 58 and its source coupled to the ground rail 16. The output node 38 of the RC timer 36 may be coupled to the input gates of the PMOS and NMOS transistors 54 and 56. The output node 50 of the earlier-stage inverter 46 may be coupled to the input gates of the PMOS and NMOS transistors 60 and 62. The output node 58 of the delay-reduced inverter 48 may be coupled to a control gate 64 of the discharge transistor 32. The transistors 54, 56, 60 and 62 may be FETs. The output of the control circuit 34 may be a control voltage 65. In other words, the control voltage 24 of FIG. 1 becomes the control voltage 65 in FIG. 2.

In some embodiments, a resistor 66 may be coupled between the output node 58 of the delay-reduced inverter 48 and the supply rail 14. In other embodiments, the resistor 66 may be excluded. To distinguish the resistor 66 from the inverter-input resistor 52, the resistor 66 may be referred to as an "output resistor", since it is at the output of the inverter chain 44. In some embodiments, a keeper circuit 68 may be coupled across the earlier-stage inverter 46. In other embodiments, the keeper circuit 68 and/or the output resistor 66 may be excluded.

In some embodiments, the output resistor 66 may have a value of a few hundred ohms, which may pull up the control voltage 65 at the control gate 64 of the discharge transistor 32. The inverter-input resistor 52 may have a value around 1000 ohms or more, which may pull down the gate voltage at the input gates of the delay-reduced inverter 48. In other words, the output resistor 66 may act as a pull-up resistor and the inverter-input resistor 52 act as a pull-down resistor, but since they are on opposite sides of the polarity-changing delay-reduced inverter 48, they may work together to expedite (speed up) the turning "off" of the discharge transistor 32 and therefore reduce the shutoff time and the previously-described current transient. Another strategy effective for the complementary NMOS power clamp will be described later in a discussion of FIGS. 4 and 5. Although the inverters 46 and 48 are illustrated with a pair of gate inputs, in other embodiments the inverters 46 and 48, such as those configured out of a NAND or NOR gate or a number of other possibilities, may have only one input. Hence, the inverters 46 and 48 may be described as having "at least one input".

In normal operation of the clamp 30 of FIG. 2, according to some embodiments of the present disclosure, once the capacitor 40 has charged to a voltage substantially above the threshold of the earlier-stage inverter 46, the inverter 46 may "trip". In this embodiment, the earlier-stage inverter 46 may be described as a first drive stage for the discharge transistor 32. Tripping the earlier-stage inverter 46 may result in the inverter 46 changing output states. For example, the earlier-stage inverter 46 may transition from asserting the voltage applied to the supply rail 14 via the transistor 54, to asserting ground via the transistor 56, on the input gates of transistors 60 and 62 of the delay-reduced inverter 48. The delay-reduced inverter 48 may be described as a second drive stage for the discharge transistor 32. Likewise, the voltage asserted on the power supply rail 14 may be asserted on the control gate of the discharge transistor 32 via the transistor 62, thereby turning "off" the discharge transistor 32. Until the foregoing sequence is completed, the power supply rail 14 may be clamped to ground via a turned on discharge transistor 32.

As previously mentioned, the time needed to charge the RC-timer 36, may "trip" the two inverters 46 and 48, and turn "off" the discharge transistor 32 may be referred as the "shut-off time" for turning "off" the discharge transistor 32. In other words, the shutoff time may be defined to include both the delay time of the control circuit 34 (RC timer 36, inverter chain 44) after starting to charge the RC-timer 36 and the delay time of the discharge transistor 32 in response to the control voltage 65. The delay time of the inverter chain 44 may include the output changing times for both of the inverters 46 and 48 in the inverter chain 44. This shutoff time for the discharge transistor 32 may be of a duration that would not result in physical damage to, for example, metal lines used for power distribution in such ICs. As previously described, the use of the inverter-input resistor 52 and the output resistor 66, if included, may allow the gate 64 of the discharge device 20 to reach its switching threshold voltage more quickly during the power ramp of the IC 10 of FIG. 1, thereby reducing the associated surge current transient. Nevertheless, the shutoff time for such a sequence may normally be longer than the duration of most ESD events. Also, because the clamp 30 is designed to turn the discharge transistor 32 "off" at a certain shutoff time during operation of the IC 10 of FIG. 1, the clamp circuit 30 may allow the IC 10 of FIG. 1 to operate normally after the discharge device 32 is turned "off".

During an ESD event, tripping the inverters 46 and 48 and turning "off" the discharge transistor 32 may also be based, at least in part, on the higher voltage applied to the power supply rail 14 associated with such an event. Such a situation may normally result in the discharge transistor 32 remaining "on" during such an ESD event, as is desirable. These attributes of the power supply clamp 12 may allow it to be employed to protect other circuit elements from potential damage or destruction resulting from the current and/or voltage of an ESD event. In this respect, the clamp 30 may shunt current between the power supply rail 14 and ground during such an ESD event.

Figure 3:
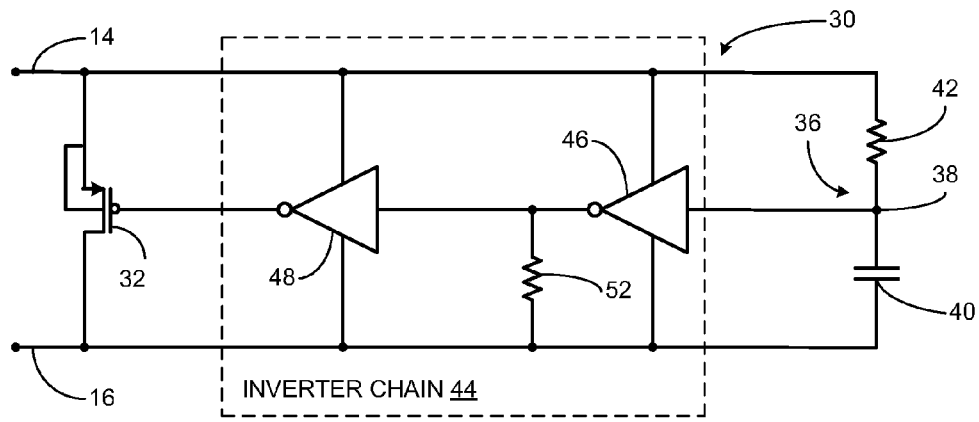
FIG. 3 illustrates a schematic diagram of the power supply clamp of FIG. 2 with removal of an output resistor and a keeper circuit, according to some embodiments of the present disclosure.

FIG. 3 illustrates a schematic diagram of the power supply clamp 30 of FIG. 2 with the removal of an output resistor 66 of FIG. 2 and the keeper circuit 68 of FIG. 2, according to some embodiments of the present disclosure. The rest of the clamp 30 remains the same, so the same reference numbers are used and the illustrated components will not be described again. As described above, although both output resistor 66 of FIG. 2 and the inverter-input resistor 52 may make additive contributions to reducing the shutoff time before the discharge transistor 32 turns "off" (non-conductive state) after powering up, the contribution of output resistor 66 may be limited and insufficient by itself for fast power ramps; hence, in the embodiment of FIG. 3, the inverter-input resistor 52 may be used as the sole resistor to expedite the turning off of the discharge transistor 32 so as to reduce the power-up current transient and therefore reduce power consumption. In this embodiment, it may be sufficient to have only the inverter-input resistor 52 as the resistor producing the desired effect of removing threshold voltage effects from the fast ramp-up of power supplies.

Referring to FIGS. 2 and 3, as one example of the effectiveness of the inverter-input resistor 52 in turning "off" the discharge transistor 32, simulations were undertaken using an example processor with a power-up ramp of the supply voltage $V_{CCX}$ of 35 milliseconds. The clamp 30, in the form of a 1.8V Vcc180 clamp, was used in combination with this processor, but with the following three different arrangements of the resistors: (1) without the output resistor 66 and without the inverter-input resistor 52; (2) with the output resistor 66, but without the inverter-input resistor 52 (i.e., including just output resistor 66); and (3) with the inverter-input resistor 52, but without the output resistor 66 (i.e., including just the inverter-input resistor 52 as shown in FIG. 3). With the first arrangement (neither resistor), the surge current through the discharge transistor 32 at this power ramp rate was observed to be about 750 mA. With the second arrangement (just the output resistor 66), the surge current in the discharge transistor 32 at this power ramp rate was not observed to improve much (reduced from about 750 mA to about 525 mA). However, with the third arrangement (just the inverter-input resistor 52 by itself), the surge current was observed to improve from about 750 mA to about 0.054 mA and easily reach the desired target for surge current reduction. Additionally, a long ESD-like pulse with 10 nsec rise time was applied in this third arrangement of FIG. 3, showing that the shutoff time for a fast ESD pulse is not much reduced—the shutoff time was observed to change from about 550 nsec to about 400 nsec. For various applications, this may be an acceptable reduction that could be further adjusted with the RC timer 36. With respect to the first two arrangements, the voltage at the timer output node 38 was observed to "sag" for a long time without the inverter-input resistor 52, due substantially to the FET threshold voltages not yet being established.

Figure 4:
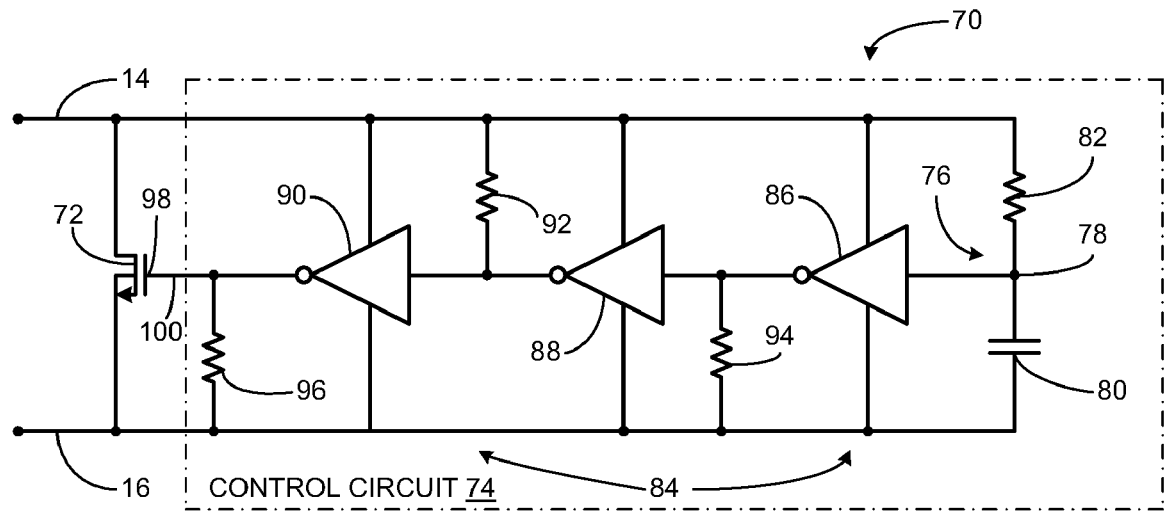
FIG. 4 illustrates a schematic diagram of a power supply clamp with an n-channel discharge transistor, according to some embodiments of the present disclosure.

FIG. 4 illustrates that the power supply clamp 12 of FIG. 1 may take the form of power supply clamp 70, according to some embodiments of the present disclosure. The discharge device 20 of FIG. 1 may take the form of an NMOS FET transistor 72 (hereafter, "discharge transistor") in FIG. 4. The discharge transistor 72 may be an n-channel transistor having its source coupled to the ground rail 16 and its drain coupled to the supply rail 14. The control circuit 22 of FIG. 1 may take the form of a control circuit 74 in FIG. 4. The control circuit 74 may include a resistance-capacitance (RC) timer 76 having an output node 78, a capacitor 80 coupled between the ground rail 16 and the output node 78, and a resistance 82 coupled between the supply rail 14 and the output node 78. In one embodiment, the resistance 82 may take the form of a discrete resistor, as shown in FIG. 4. In another embodiment, the resistance 82 for the RC timer 76 may be provided by the resistance of a PMOS transistor with its source coupled to the supply rail 14, its drain coupled to the output node 38, and its gate coupled to ground rail 16 through a resistor.

The control circuit 74 may include an inverter chain 84 with an additional inverter 86, an earlier-stage inverter 88, and a final-stage inverter 90. In this embodiment, both the final-stage inverter 90 and the earlier-stage inverter 88 may be referred to as the "delay-reduced inverters" 88 and 90, respectively, as will be described hereinafter. Each of the three inverters 86, 88, and 90 may include a PMOS transistor and an NMOS transistor. Since the design of these inverters 86, 88, and 90 are the same as the inverters 46 and 48 illustrated in FIG. 2, the pairs of pull-up and pull-down transistors making up each of the inverters 86, 88, and 90 are not shown in FIG. 4 and instead are illustrated with inverter symbols. However, the inverters 86, 88 and 90 may have different configurations. Additionally, the inverters 86, 88 and 90 are illustrated with a pair of gate inputs; however, in other embodiments the inverters 46 and 48, such as those configured out of a NAND or NOR gate or a number of other possibilities, may have only one input. Hence, the inverters 86, 88 and 90 may be described as having "at least one input".

Because the discharge transistor 72 may be an NMOS transistor, an odd number of inverters may be used in the inverter chain 84. An output of the additional inverter 86 may be coupled to an input of the earlier-stage inverter 88 and the output of the earlier-stage inverter 88 may be coupled to the input of the final-stage inverter 90.

Coupled between the output of the earlier-stage inverter 88 and the power supply rail 14 (having voltage $V_{CCX}$) may be a first inverter-input resistor 92. The NMOS discharge transistor 72 of FIG. 4 may take the place of the PMOS discharge transistor 32 of FIG. 2; hence, the first inverter-input resistor 92 of FIG. 4 is a pull-up resistor, whereas the inverter-input resistor 52 of FIG. 2 may be a pull-down resistor. The inclusion of three inverters may allow for the option of including a second inverter-input resistor 94 coupled between the output of the additional inverter 86 and the ground rail 16. In some embodiments, this second inverter-input resistor 94 may be included and in other embodiments it may be excluded. An output resistor 96 may be coupled between the output of the final-stage inverter 90 and the ground rail 16; however, like the output resistor 66 of FIG. 2, in some embodiments, the output resistor 96 of FIG. 4 may be excluded. A keeper circuit is not shown in parallel with the additional inverter 86; however, in some embodiments the keeper circuit may be included. The output node of the final-stage inverter 90 may be coupled to a control gate 98 of the discharge transistor 72. The output of the control circuit 74 may be a control voltage 100; hence, the control voltage 24 of FIG. 1 may become the control voltage 100 in FIG. 4.

In some embodiments, the output resistor 96 may have a value of a few hundred ohms, which may pull down the control voltage 100 at the control gate 98 of the discharge transistor 72. The first inverter-input resistor 92, around 1000 ohms or more, may pull up gate voltages at the input gates of the final-stage inverter 90 in the previous stage. If included, in some embodiments, the second inverter-input resistor 94, also in the range of 1000 ohms or more, may pull down gate voltages of the input gates of the earlier-stage inverter 88. All three resistors 92, 94 and 96 may work together to reduce the shutoff time of the discharge transistor 72 and may reduce the voltage threshold effects as the power supply $V_{CCX}$ is ramped up. The impact may be on power-saving, which may be of growing importance in integrated circuit design, particularly for microprocessors and chipsets.

Figure 5:
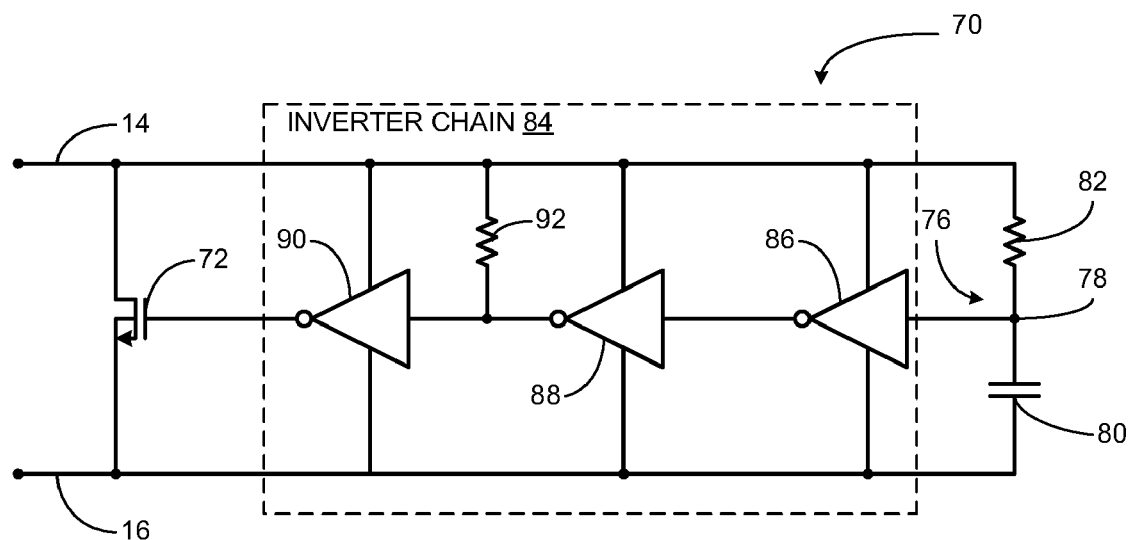
FIG. 5 illustrates a schematic diagram of the power supply clamp of FIG. 4 with removal of an output resistor and an inverter-input resistor, according to some embodiments of the present disclosure.

FIG. 5 illustrates a schematic diagram of the power supply clamp 70 of FIG. 4 with the removal of the output resistor 96 in FIG. 4 and the second inverter-input resistor 94 in FIG. 4, according to some embodiments of the present disclosure. The rest of the clamp 70 remains the same, so the same reference numbers are used and the illustrated components will not be described again. As described above, although the output resistor 96 of FIG. 4 and the inverter-input resistors 92 and 94 may make additive contributions to reducing the shutoff time before the discharge transistor 32 turns off (nonconductive state) after powering up, the contribution of output resistor 96 may be limited and insufficient by itself for fast power ramps; hence, in the embodiment of FIG. 5 the output resistor 96 of FIG. 4 may be removed. In FIG. 5 the inverter-input resistor 92 may be selected to be the sole resistor to expedite the turning off of the discharge transistor 72 so as to reduce the power-up current transient and therefore reduce power consumption. In another embodiment, the inverter-input resistor 94 of FIG. 4, applied to the input gates of the earlier-stage inverter 88, may be the sole resistor to expedite the turning off of the discharge transistor 72 so as to reduce the power-up current transient and therefore reduce power consumption.

Figure 6:
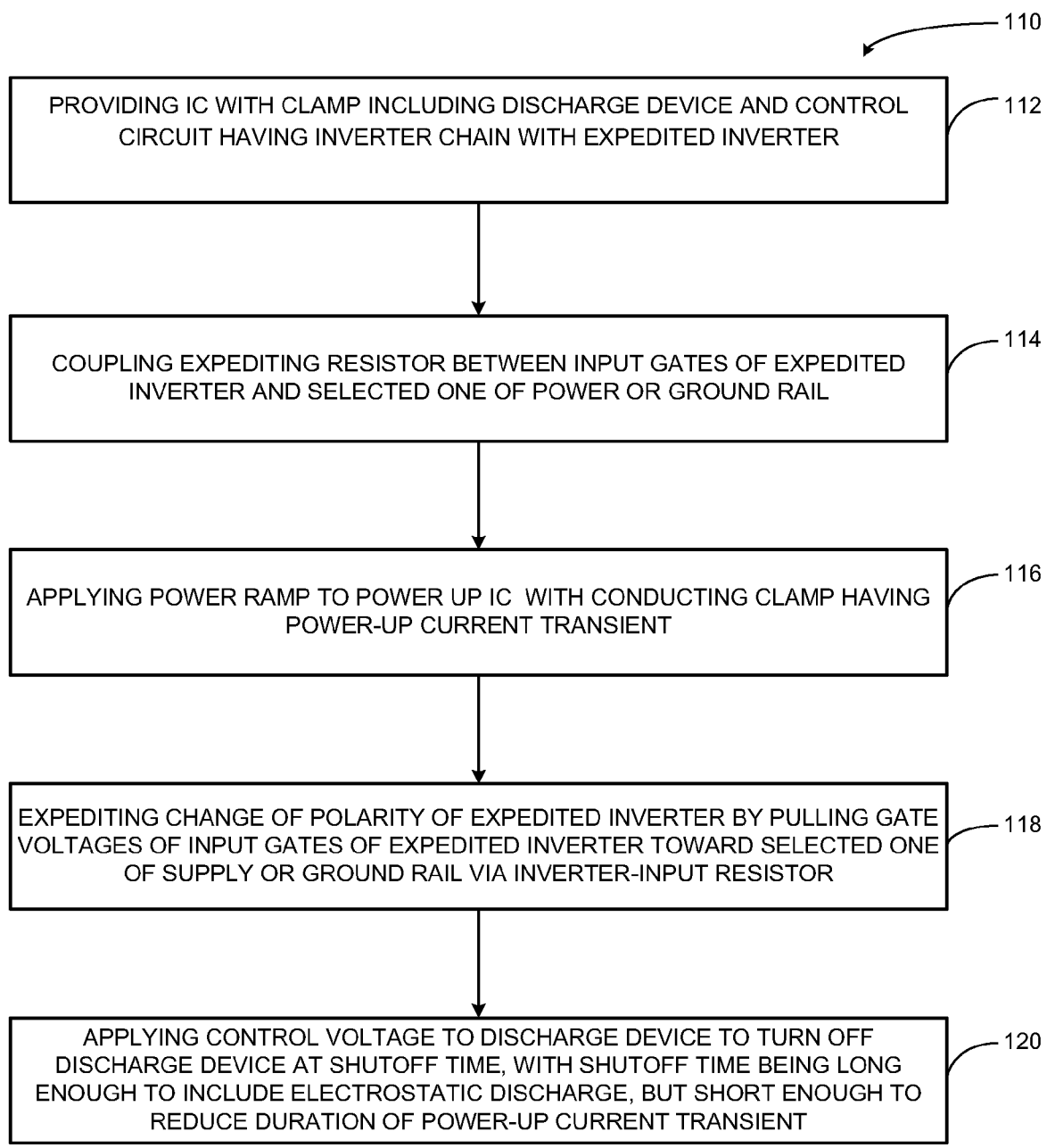
FIG. 6 illustrates a flow chart of a method of operating the integrated circuit of FIG. 1, according to various embodiments of the present disclosure.

FIG. 6 illustrates a flow chart of the operations in a method 110 of reducing a power-up current surge transient in the ESD power supply clamp 12 of the IC 10 of FIG. 1. More specifically, the method 110 may cause the control circuit 22 of the clamp 12 to generate the control voltage 24 to turn off the discharge device 20 at a designed shutoff time, with the shutoff time being long enough to include an electrostatic discharge, if any, passing though the discharge device 20, but short enough to reduce the power-up current transient through the discharge device 20.

Referring to FIGS. 1 and 6, an operation 112 of FIG. 6 may include providing the IC 10 having the clamp 12 with the discharge device 20 to shunt an electrostatic discharge, if any, on the supply rail 14 to the ground rail 16 and the control circuit 22, including the inverter chain having at least one delay-reduced inverter, to generate the control voltage 24 to turn the discharge device 20 "off" at a shutoff time so as to be in a non-conductive state.

An operation 114 of FIG. 6 may include coupling the inverter-input resistor between the pair of input gates of the delay-reduced inverter in the inverter chain and a selected one of the power rail 14 or ground rail 16. In some embodiments, the operation 112 may further include providing the discharge device 20 in the form a p-channel discharge transistor with a control gate to receive the control voltage 24 from the control circuit 22 and the operation 114 may further include coupling the inverter-input resistor between the pair of input gates of the delay-reduced inverter and the ground rail 16. In other embodiments, the operation 112 may further include providing the discharge device 20 in the form an n-channel discharge transistor with a control gate to receive the control voltage 24 from the control circuit 22 and the operation 114 may further include coupling the inverter-input resistor between the pair of input gates of the delay-reduced inverter and the power rail 14. The operation 114 further may further include selecting the inverter-input resistor to have a linear I-V curve that substantially goes through zero and sizing the inverter-input resistor to have a resistance value in the range of about 1 kilohm or more.

An operation 116 of FIG. 6 may include applying a power ramp from the power supply 18 to the supply rail 14 to power up the IC 10, with discharge device 20 having a power-up, surge current transient through the discharge device 20 in response to the power ramp. An operation 118 of FIG. 6 may include expediting the change of polarity (reduced output changing time) at the output of the delay-reduced inverter by pulling the gate voltages of the pair of input gates of the delay-reduced inverter toward the selected one of the supply rail 14 or ground rail 16 via the inverter-input resistor and therefore speed up the generation of the switch-triggering control voltage 24 of the control circuit 22. An operation 120 of FIG. 6 may include applying the speeded-up control voltage 24 to the discharge device 20 to turn off the discharge device 20 at the shutoff time, with the shutoff time being long enough to include an electrostatic discharge, if any, passing though the discharge device 20, but short enough to reduce the amount of the power-up current transient generated by and passing through the discharge device 20.

Figure 7:
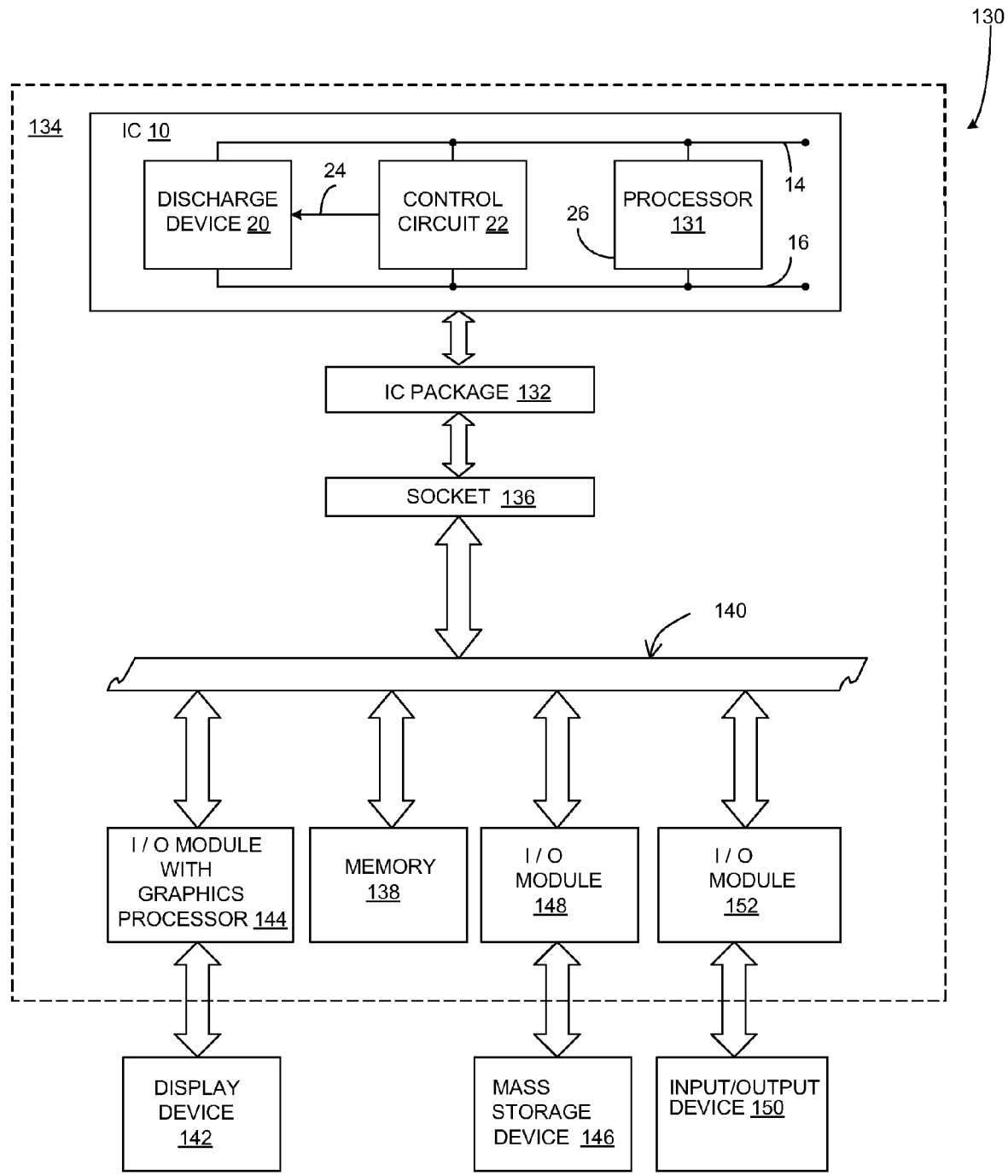
FIG. 7 illustrates a system incorporating the integrated circuit of FIG. 1, according to various embodiments of the present disclosure.

FIG. 7 illustrates a computer system 130, which is one of many possible systems in which the IC 10 of FIG. 1 may be used, according to some embodiments of the present disclosure. However, the various embodiments of the present disclosure are applicable to systems other than computer systems, and the computer system 130 is merely illustrative of one application. In this illustrative example, the internal circuitry 26 of FIG. 1 may be a processor 131 mounted in an IC package 132. As in FIG. 1, the IC 10 may include the clamp 12 which may take many different forms, according to the various embodiments of the present disclosure. The clamp 12 may include the control circuit 22 providing the control voltage 24 to the discharge device 20. The discharge device 20, control circuit 22, and processor 131 are coupled between the supply rail 14 and ground rail 16.

In the system 130, the IC package 132 may be mounted on a substrate or printed circuit board (PCB) 134 via a socket 136. The PCB 134 may be a motherboard. In addition to the socket 136 and the IC package 132, the PCB 134 may have mounted thereon a main memory 138 and a plurality of input/output (I/O) modules for external devices or external buses, all coupled to each other by a bus system 140 on the PCB 134. More specifically, the system 130 may include a display device 142 coupled to the bus system 140 by way of an I/O module 144, with the I/O module 144 having a graphical processor and a memory. The I/O module 144 may be mounted on the PCB 134 or may be mounted on a separate expansion board. The system 130 may further include a mass storage device 146 coupled to the bus system 140 via an I/O module 148. Another I/O device 150 may be coupled to the bus system 140 via an I/O module 152. Additional I/O modules may be included for other external or peripheral devices or external buses.

Examples of the main memory 138 include, but are not limited to, static random access memory (SRAM) and dynamic random access memory (DRAM). Examples of the mass storage device 146 include, but are not limited to, a hard disk drive, a compact disk drive (CD), a digital versatile disk driver (DVD), a floppy diskette, a tape system and so forth. Examples of the input/output devices 150 may include, but are not limited to, devices suitable for communication with a computer user (e.g., a keyboard, cursor control devices, microphone, a voice recognition device, a display, a printer, speakers, and a scanner) and devices suitable for communications with remote devices over communication networks (e.g., Ethernet interface device, analog and digital modems, ISDN terminal adapters, and frame relay devices). In some cases, these communications devices may also be mounted on the PCB 134. Examples of the bus system 140 include, but are not limited to, a peripheral control interface (PCI) bus, and Industry Standard Architecture (ISA) bus, and so forth. The bus system 140 may be implemented as a single bus or as a combination of buses (e.g., system bus with expansion buses). Depending upon the external device, I/O modules internal interfaces may use programmed I/O, interrupt-driven I/O, or direct memory access (DMA) techniques for communications over the bus system 140. Depending upon the external device, external interfaces of the I/O modules may provide to the external device(s) a point-to point parallel interface (e.g., Small Computer System Interface—SCSI) or point-to-point serial interface (e.g., EIA-232) or a multipoint serial interface (e.g., FireWire). Examples of the IC 10 may include any type of computational circuit such as, but not limited to, a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), or any other type of processor or processing circuit.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present disclosure. Therefore, it is manifestly intended that this invention be limited only by the claims and the equivalents thereof.

What is claimed is:

1. An apparatus, comprising:
a switchable discharge device configured to discharge an electrostatic discharge; and
a control circuit configured to generate a control voltage to turn off the discharge device at a shutoff time, with the shutoff time being long enough to allow the electrostatic discharge though the discharge device but short enough to reduce a duration of a power-up current transient through the discharge device, the control circuit including:
an earlier-stage inverter;
a delay-reduced inverter having an input terminal coupled to an output terminal of the earlier-stage inverter, wherein the delay-reduced inverter includes an inverter-input resistor coupled to the input terminal of the delay-reduced inverter, wherein the inverter-input resistor is electrically coupled between the input terminal of the delay-reduced inverter and one of a supply rail and a ground rail; and
a keeper inverter having an output terminal and an input terminal, wherein the output terminal of the keeper inverter is coupled to the input terminal of the delay-reduced inverter, wherein the input terminal of the keeper inverter is coupled to an output terminal of the delay-reduced inverter, wherein the control circuit includes no more than the one inverter-input resistor.

2. The apparatus of claim 1, wherein:
the discharge device and the control circuit are coupled between the supply rail and the ground rail; and
the control circuit is further configured to generate the control voltage in response to the power ramp on the supply rail and is coupled to the discharge device to provide the control voltage to the discharge device.

3. The apparatus of claim 2, wherein the inverter-input resistor has a linear I-V curve that substantially goes through zero.

4. The apparatus of claim 3, wherein the inverter-input resistor has a resistance value of about 1 kiloohm or more.

5. The apparatus of claim 2, wherein
the discharge device comprises a selected one of a p-channel transistor or an n-channel discharge transistor and has a control gate to receive the control voltage; and
the inverter-input resistor is configured to reduce an output changing time to trip the delay-reduced inverter, with the shutoff time including the reduced output changing time.

6. The apparatus of claim 2, wherein
the delay-reduced inverter is a final-stage inverter;
the discharge device comprises a p-channel discharge transistor having a control gate coupled to the output terminal of the final-stage inverter to receive the control voltage; and
the inverter-input resistor is coupled between the output terminal of the earlier-stage inverter and the ground rail.

7. The apparatus of claim 2, wherein
the delay-reduced inverter is a final-stage inverter;
the final-stage inverter further includes:
the input terminal of the delay-reduced inverter having a first and a second input gate, with the output of the final-stage inverter being commonly responsive to the first and the second input gates;
an output node;
a p-channel field-effect transistor coupled between the supply rail and the output node and having the first input gate; and
an n-channel field-effect transistor coupled between the ground rail and the output node and having the second input gate;
the discharge device comprises a p-channel discharge transistor having a control gate coupled to the output node of the final-stage inverter to receive the control voltage; and
the inverter-input resistor is coupled between the output of the earlier-stage inverter and the ground rail.

8. The apparatus of claim 7, wherein
the earlier-stage inverter further includes a pair of input gates; and the control circuit further includes a timer having an output node coupled to the pair of input gates of the earlier-stage inverter, a resistance coupled between the supply rail and the output node of the timer, and a capacitor coupled between the ground rail and the output node of the timer.

9. The apparatus of claim 7, further comprising:
an output resistor coupled between the control gate of the p-channel discharge transistor and the power rail.

10. The apparatus of claim 2, wherein
the delay-reduced inverter is a final-stage inverter;
wherein the control circuit chain further includes an additional inverter including an output terminal coupled to the input terminal of the earlier stage inverter and an input terminal coupled to receive a signal from a timer;
the discharge device is an n-channel discharge transistor having a control gate coupled to an output terminal of the final-stage inverter to receive the control voltage; and
the inverter-input resistor is coupled between the output of the earlier-stage inverter and the supply rail.

11. The apparatus of claim 10, wherein
the additional inverter further includes a pair of input gates; and
the control circuit further includes the timer having an output node coupled to the pair of input gates of the additional inverter, a resistance coupled between the supply rail and the output node of the timer, and a capacitor coupled between the ground rail and the output node of the timer.

12. The apparatus of claim 11, further comprising:
an output resistor coupled between the control gate of the n-channel discharge transistor and the ground rail.

13. The apparatus of claim 2, wherein
the earlier-stage inverter is a first earlier-stage inverter;
the delay-reduced inverter is a second earlier-stage inverter;
the inverter chain further comprises a final-stage inverter including at least one input and an output coupled to the discharge device; and the second earlier-stage inverter including at least one output coupled to the output terminal of the first earlier-stage inverter;
the discharge device comprises an n-channel discharge transistor having a control gate coupled to the output of the final-stage inverter to receive the control voltage; and
the inverter-input resistor is coupled between the ground rail and the output of additional inverter.

14. The apparatus of claim 2, wherein
the discharge device is configured to provide a discharge path during an electrostatic discharge on the supply rail by electrically coupling the supply and the ground rails during the electrostatic discharge when the discharge device is disposed in a conductive state;

the discharge device is further configured to remain in the conductive state until receiving the control voltage to turn off; and the discharge device is responsive to the power ramp to produce the power-up current transient through the discharge device.

15. The apparatus of claim 14, wherein the power ramp is longer in duration than the electrostatic discharge and is in a range of 10 s of microseconds or lower.

16. A method, comprising:

applying a supply voltage to a supply rail to power up an integrated circuit which in turn produces a power-up current transient through a discharge device of an electrostatic discharge protection clamp of the integrated circuit;

expediting a polarity output change of a delay-reduced inverter in a control circuit of the integrated circuit by pulling an input voltage of the delay-reduced inverter toward a voltage of the selected one of the power or a ground rail with no more than one inverter-input resistor, wherein said one inverter-input resistor is coupled to an input terminal of the delay-reduced inverter and coupled to the one of the power or the ground rail; and generating a control voltage from the control circuit to turn off the discharge device at a shutoff time, with the shutoff time being long enough to include the electrostatic discharge passing though the discharge device but short enough to reduce a duration of the power-up current transient in the event of an electrostatic discharge, shunting the electrostatic discharge on the supply rail to the ground rail through the discharge device;

generating the control voltage with an earlier-stage inverter having an input terminal coupled to a timer and an output terminal coupled to the input terminal of the delay-reduced inverter; and stabilizing operation of the control circuit with an additional inverter having an input terminal coupled to an output terminal of the delay-reduced inverter and having an output terminal coupled to the input terminal of the delay-reduced inverter.

17. The method of claim 16, wherein the inverter-input resistor has a resistance value in the range of about 1 kiloohm or more, and has a linear I-V curve that substantially goes through zero.

18. The method of claim 16, wherein the discharge device is in a form of a p-channel discharge transistor with a control gate to receive the control voltage from the control circuit; and the inverter-input resistor is coupled between the at least one input terminal of the delay-reduced inverter and the ground rail.

19. The method of claim 16, wherein the discharge device is in a form of an n-channel discharge transistor with a control gate to receive the control voltage from the control circuit; and the inverter-input resistor is coupled between the at least one input terminal of the delay-reduced inverter and the supply rail.

20. A system, comprising:

a voltage supply coupled to a power rail and a ground rail and configured to generate a power ramp on the supply rail;

a processor coupled between the power and the ground rail;

an electrostatic discharge protection (ESD) clamp including a switchable discharge device configured to discharge an electrostatic discharge; and a control circuit configured to generate a control voltage to turn off the discharge device at a shutoff time, with the shutoff time being long enough to allow the electrostatic discharge though the discharge device but short enough to reduce a duration of a power-up current transient through the discharge device, the control circuit including:

an earlier-stage inverter;

a delay-reduced inverter having an input terminal coupled to an output terminal of the earlier-stage inverter, wherein the delay-reduced inverter includes an inverter-input resistor coupled to the input terminal of the delay-reduced inverter, wherein the inverter-input resistor is electrically coupled between the input terminal of the delay-reduced inverter and one of the supply rail and the ground rail; and a keeper inverter having an output terminal and an input terminal, wherein the output terminal of the keeper inverter is coupled to the input terminal of the delay-reduced inverter, wherein the input terminal of the keeper inverter is coupled to an output terminal of the delay-reduced inverter, wherein the control circuit includes no more than the one inverter-input resistor;

a mass storage device; and a bus coupled to the processor and the mass storage device.

21. The system of claim 20, wherein:

the discharge device and the control circuit are coupled between a supply rail and a ground rail; and the control circuit is further configured to generate the control voltage in response to the power ramp on the supply rail and is coupled to the discharge device to provide the control voltage to the discharge device.

22. The system of claim 21, wherein the inverter-input resistor has a linear I-V curve substantially that goes through zero.

23. The system of claim 22, wherein the inverter-input resistor has a resistance value in the range of about 1 kiloohm or more.

24. The system of claim 21, wherein the discharge device is a selected one of a p-channel discharge transistor or an n-channel discharge transistor and has a control gate to receive the control voltage; and the inverter-input resistor is configured to reduce an output changing time to trip the delay-reduced inverter, with the shutoff time including the reduced output changing time.

25. The system of claim 21, wherein the earlier-stage inverter is a first earlier-stage inverter, wherein the delay-reduced inverter is a final-stage inverter; and the inverter chain further includes a second earlier-stage inverter having an output terminal coupled to an input terminal of the final-stage inverter and having an input terminal coupled to the output terminal of the first earlier-stage inverter.

26. The system of claim 21, wherein the discharge device is configured to provide a discharge path during an electrostatic discharge on the supply rail by electrically coupling the supply and the ground rails during the electrostatic discharge when the discharge device is disposed in a conductive state;

the discharge device is further configured to remain in the conductive state until receiving the control voltage to turn off; and the discharge device is configured to be responsive to the power ramp to produce the power-up current transient through the discharge device.

27. The system of claim 26, wherein the power ramp is longer in duration than the electrostatic discharge and is in a range of 10 s of microseconds or lower.

* * * * *